United States Patent
Scheffer

[15] 3,662,643
[45] May 16, 1972

[54] SELF-TAPPING SCREW INSERT

[72] Inventor: Harry Scheffer, Brachwede, Westphalia, Germany

[73] Assignee: Bollhoff & Co., Brachwede, Westphalia County, Germany

[22] Filed: May 15, 1970

[21] Appl. No.: 37,662

[52] U.S. Cl. ..................................85/46, 85/44, 151/41.73
[51] Int. Cl. .................F16b 25/00, F16b 35/00, F16b 39/30
[58] Field of Search .............85/44, 46, 20, 47; 151/41.73; 10/152

[56] References Cited

UNITED STATES PATENTS

| | | | |
|---|---|---|---|
| 338,956 | 3/1886 | Hall | 85/44 |
| 2,005,672 | 6/1935 | Chaffee | 85/46 |
| 2,380,724 | 7/1945 | Crooks | 85/46 |
| 2,967,448 | 1/1961 | Hallock | 85/21 |
| 3,092,162 | 6/1963 | Johnsen | 85/44 X |
| 3,198,231 | 8/1965 | Bisbing | 151/41.73 |
| 3,260,150 | 7/1966 | Colman | 85/47 |
| 3,391,721 | 7/1968 | Rosan | 151/22 X |
| 3,498,353 | 3/1970 | Barry | 151/41.73 |

FOREIGN PATENTS OR APPLICATIONS

| | | | |
|---|---|---|---|
| 552,928 | 1/1923 | France | 85/20 |

Primary Examiner—Ramon S. Britts
Attorney—Beaman & Beaman

[57] ABSTRACT

This invention relates to a screw threaded insert or member cutting its own thread in a workpiece, adapted to be fitted in a workpiece of soft material, such as for instance aluminum, plastics, wood, or the like, wherein the thread has flanks differentially inclined relative to a plane normal to the axis of the thread at angles predetermined in accordance with specific mathematical relationships so as to be self-locking against rotation due to axial loading of the insert in the direction of pull-out while permitting installation of the insert under axial loading in the opposite direction.

11 Claims, 3 Drawing Figures

SELF-TAPPING SCREW INSERT

BACKGROUND OF THE INVENTION

Self-tapping screw threaded inserts or members are known to be effective in providing resistance to tearing out from soft materials. When used in connection with plastics workpieces, such members render superfluous the working step of placing the workpieces in pouring moulds, injection moulds or pressure moulds to form screwthreads thereon, thus increasing the output of the workpiece production plant. The known inserts are provided externally with a thread similar to that of the wood screw thread, so that introduction of the insert is rendered possible by a torque which becomes effective when the insert cuts the reception thread in the workpiece. In this operation, the screw threaded member or insert is either forced directly into the material of the workpiece or introduced into a prepared elongated hole therein.

PRIOR ART

It is known in connection with a conventional screw that with a flat thread the pitch angle $\gamma$ must be smaller than or equal to the friction angle $\rho$, if the screw is to be self-locking. The friction angle $\rho$ is calculated, using the formula:

$$\mu = tg\, \rho,$$

from the friction number $\mu$ between two materials. According to Hutte Band I, 27th Edition, 1952, page 402, with threads having a flank inclined towards the axis, the friction number $\mu$ must be replaced by the friction number $\mu'$, and the friction angle $\rho$ must be replaced by the friction angle $\rho'$, the friction number $\mu'$ being obtained by dividing the cosine of the inclination angle $\beta$, which equals half the flank angle of the respective thread having an inclined flank. Between the pitch angle $\gamma$, the inclination angle $\beta$, the friction number $\mu$ and the modified friction angle $\rho$, the following relationship accordingly exists:

$$tg\, \rho' = \mu \cdot \sqrt{1 + \cos^2 \gamma \cdot tg^2 \beta}$$

For $\rho' = \gamma$ there will be equilibrium.

OBJECT OF THE INVENTION

It is an object of the invention to provide a threaded insert or member, the external thread of which renders it possible to introduce it into the workpiece by means of a force effective in the direction of the axis of the threaded member, whereby said threaded insert or member will automatically turn according to its pitch, the thread being designed in such a manner that, after installation, "pull-out" forces acting in an axial direction cannot dislodge the insert or member by causing rotation thereof, i.e., the insert or member is self-locking in the pull-out direction.

BRIEF SUMMARY OF THE INVENTION

This object is achieved, according to the invention, in that with the predetermined pitch angle $\gamma$ and with a predetermined friction angle $\rho$ which is determined by the friction number $\mu$ when cutting is taking place between the material of the threaded member and that of the workpiece, the angle of inclination $\gamma 1$, between the plane through the screwthread peak extending normally with respect to the axis of the threaded member and the flank of the thread, which is inclined in a direction away from that end of the threaded member which after installation lies on the surface of the workpiece or projects therefrom, is selected in such a manner that:

$$tg\gamma > tg\rho \cdot \sqrt{1 + \cos^2 \gamma \cdot tg^2 \gamma 1};$$

and the angle $\gamma 2$ between the said plane and the flank inclined towards the said end of the threaded member is selected in such a manner that:

$$tg\, \gamma \leq tg\, \rho \cdot \sqrt{1 + \cos^2 \gamma \cdot tg^2 \beta 2},$$

wherein the pitch angle $\gamma$ is selected to be greater than the predetermined friction angle $\rho$.

FURTHER FEATURES OF THE INVENTION

Such a screwthreaded member or insert may be introduced into the workpiece practically without introduction of any additional friction with the aid of a suitable tool, the fitting head of which may rotate when the threaded member rotates automatically according to the pitch thereof.

Preferably, the threaded member has an internal or additional external thread for mounting structural members to the workpiece.

DESCRIPTION OF EMBODIMENTS

Figure 3:
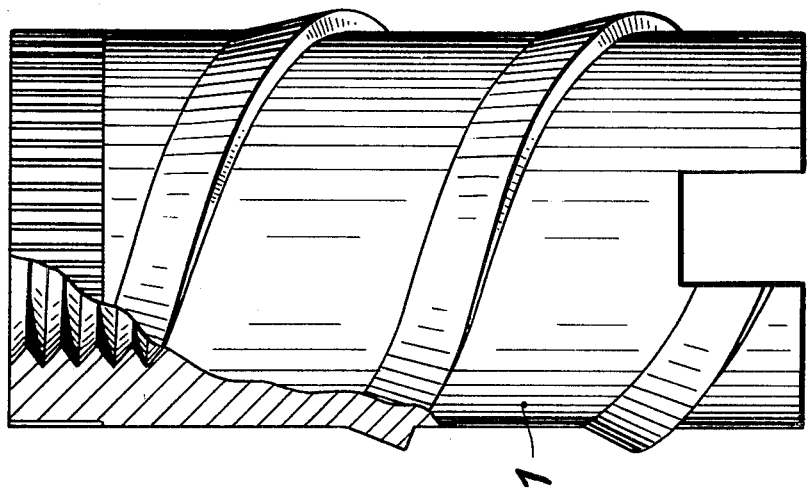
Figure 1:
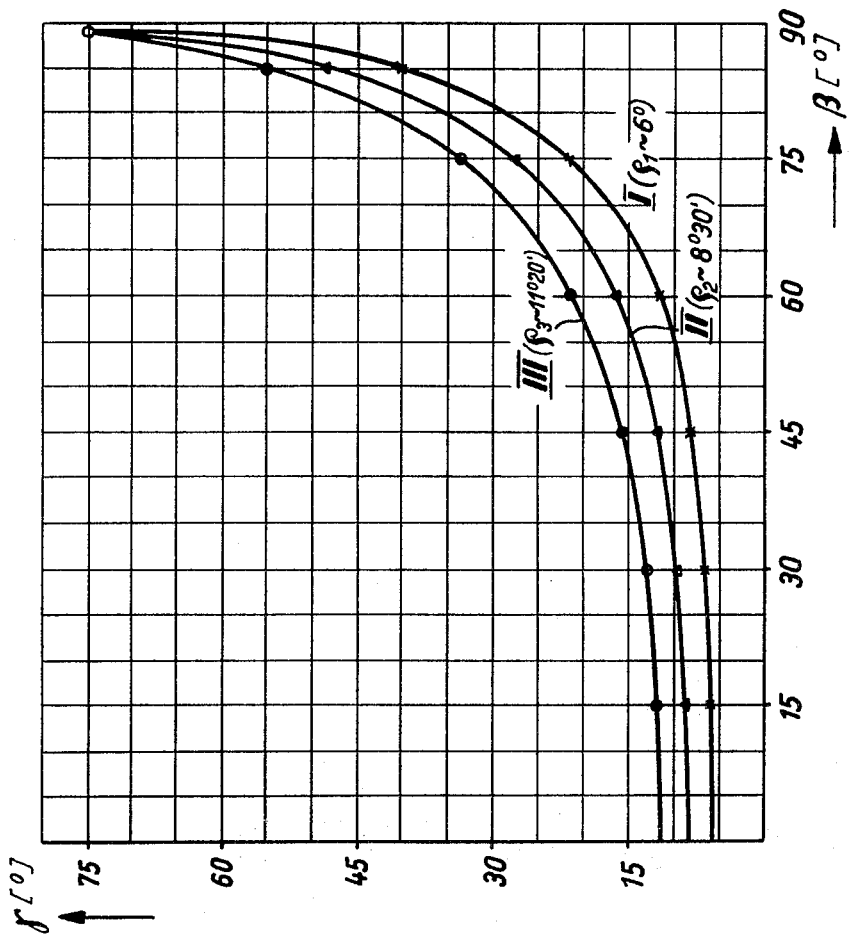
Figure 2:
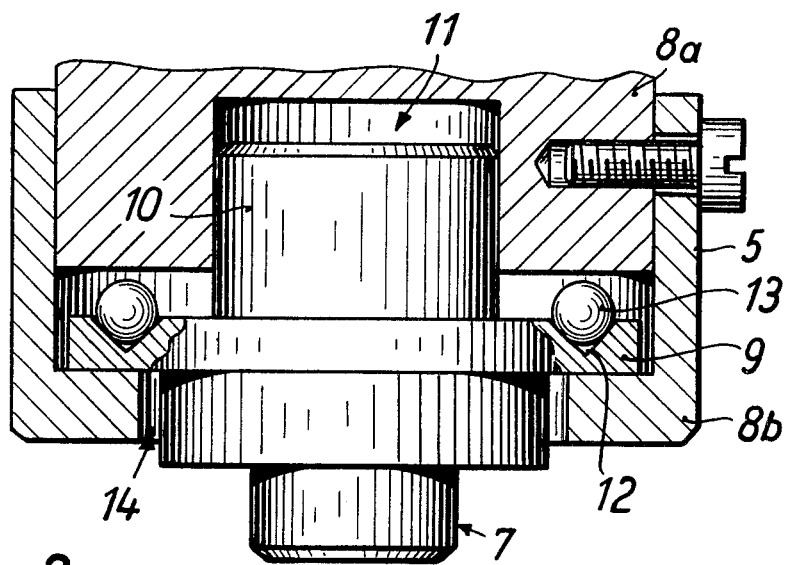
Figure 2:
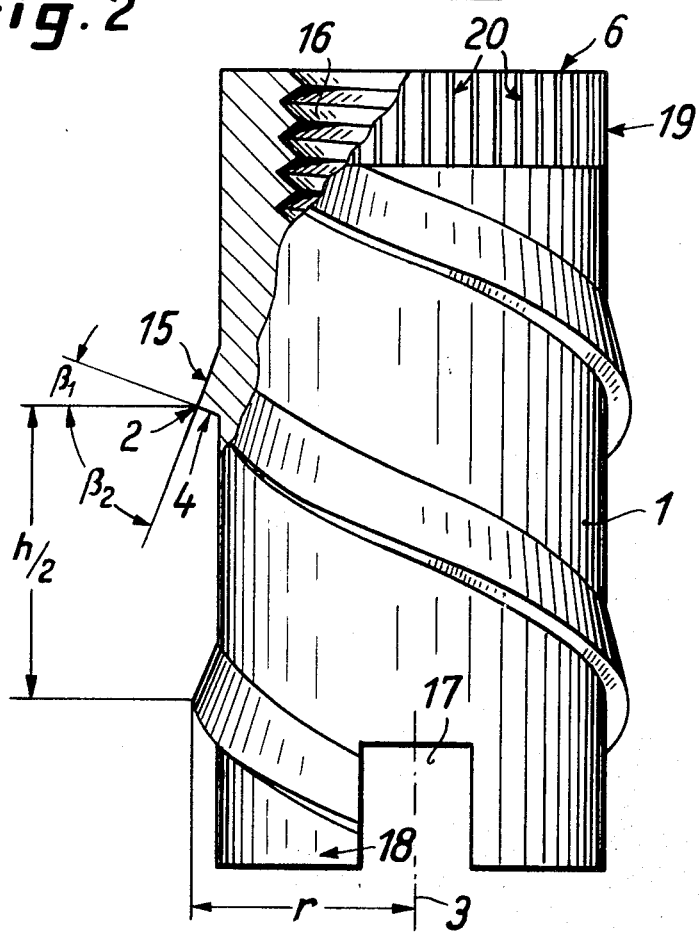

The invention will now be described in more detail and by way of example with reference to the accompanying drawings, in which:

FIG. 1 shows graphs of the function:

$$tg\, \gamma = \mu \cdot \sqrt{1 + \cos^2 \gamma \cdot tg^2 \beta}$$

for the three different predetermined $\mu$-values;

FIG. 2 shows a screw threaded member according to the invention having a double thread, and also shows the head of a driving device according to the invention for such a screw threaded member, and FIG. 3 shows a screwthreaded member having a variable pitch angle thread. FIG. 1 shows three graphs in a coordinate system, the abscissa values of which are values of the inclination angles $\beta$ and the ordinate values of which are the pitch angles $\gamma$ of the self-tapping screw insert. The curve I corresponds to a friction number $\mu$ of 0.1, the curve II corresponds to a friction number of 0.15, and the curve III corresponds to a friction number of 0.20; the corresponding friction angles have the following values:

$$\rho_1 \approx 6°;\, \rho_2 \approx 8°\, 30^1;\, \text{and}\, \rho_3 \approx 11°\, 20^1.$$

With $tg \leq \mu'$, self-locking will occur, so that the screw insert will be self-locking for all pairs $(\beta,\gamma)$ which are below the curves given as examples, while for higher pairs $(\beta, \gamma)$, self-locking will not occur. FIG. 1 shows clearly that with an increasing pitch angle $\gamma$ of the thread, the inclination angle $\beta$ increases very rapidly for maintenance of a self-locking effect in the "pull-out" direction.

In accordance with FIG. 1, the pitch angle $\gamma$ is determined by the equation:

$$tg\, \gamma = h/2r\, \pi$$

A pitch angle $\gamma$, for instance of 15°, is selected in correspondence with a development of the group of curves of FIG. 1. In order to be able to carry out installation of the screw threaded insert without any rotary force applied from outside, no self-locking must occur in the direction of installation. This means the pitch angle $\gamma$ must always be selected to be greater than friction angle. The friction angle must be determined by tests and will be greater than the value resulting from the friction caused just by movement, because the thread has to be formed in the workpiece (in the case of a nut and a screw both threads are already formed so that only friction caused by movement occurs). In the following, reference will be made to an upper end and a lower end of the screw threaded member or insert, the upper end being that which, after installation of the threaded member in the workpiece, terminates at the surface of the workpiece or projects therefrom.

In FIG. 2, the flank 4, inclined towards the lower end of the threaded member from the plane extending through the peak 2 of the thread normal to the axis 3 of the threaded member 1, makes an angle of inclination $\beta 1$ with the said plane. The value of the angle of inclination $\beta 1$ is selected to be such that the pair $(\gamma, \beta 1)$ is disposed to the left and above the group of curves shown in FIG. 1. The member or insert may be moved axially by means of a driving device 5 placed on the smooth surface 6 of the upper end of the threaded member, whereby it will automatically rotate. As the portion 7 of the driving device 5 seated on the insert or member 1 is arranged to be rotatable with respect to the housing 8a and 8b, no additional friction will occur. Part 7 is provided with a cylindrical extension 10 which is guided in a bore 11 of the housing portion 8a, and also with a flange 9 having an annular groove 12 formed thereon as a race for balls 13, thereby to form a thrust bearing. Before the driving device is used for installation, the part 7 has the underside of its flange 9 bearing on the annular area of the housing portion 8b; if the portion of the part 7 disposed below the flange 9 moves upwards through the opening 14 formed in the housing portion 8b, then the cylindrical portion 10 will slide upwardly in the opening 11 until the balls 13 seat on the underside of the housing portion 8a, the housing portion 8a and the housing portion 8b cooperating to define the range of movement of the flange 9.

The angle of inclination $\beta 2$, between the flank 15 inclined towards the upper end of the threaded member 1 and the above-defined plane is now selected to be such that the point determined by the selected pair ($\beta$, $\gamma 2$) will be disposed to the right of and below the group of curves in FIG. 1. Self-locking will then occur, so that the screwthreaded member will not be dislodged by rotation occurring due to an axially applied tensional load in the pull-out direction. The threaded member shown in FIG. 2 is provided with an inner screw thread 16 into which screws may be threaded to secure in position other structural members. In another embodiment, the upper end of the screw threaded member 1 is not flush with the surface of the workpiece but projects therefrom as a threaded bolt. The inner screw thread or the bolt thread are preferably standard threads which are always self-locking, so that a great safety is afforded against movement of the insert in rotation under an axially applied tensional load. The inner threads or bolt threads used as mounting threads may have directions of pitch opposite to the pitch of the thread characterized by the flanks 4 and 15. In accordance with FIG. 2, the threaded member, if designed as a threaded insert with inner thread, may be slotted at the lower end thereof in order to accommodate the chips that may occur during installation.

Preferably, a portion 18 is provided at the lower end of the threaded member 1 which is not provided with an external thread, so that the insert may be introduced more easily into a prepared hole the diameter of which approximately corresponds to said non-threaded portion 18 at the lower end.

The lower end of member 1 is also provided with a slot 17 which provides a clearance for chips created during installation. The external thread intersects the slot 17 to define sharp cutting edges which remove material in the form of chips which are received within slot 17.

At the upper end of the threaded member 1, there may be provided a portion 19 which is likewise not provided with a thread but is knurled, as indicated at 20, to secure the insert 1 against rotation.

Although the threaded insert 1 shown in FIG. 2 has a double thread, in other embodiments the thread may be single or of higher multiple, in order to obtain during installation, and after installation when subjected to a load, the most favorable distribution of forces between the thread areas of the insert member 1 and the thread areas cut into the workpiece.

In another embodiment shown in FIG. 3 the pitch angle $\gamma$ decreases upwardly. Such a thread may be designated as a differential thread. When using a threaded member having such a thread, pre-stressing will occur in the material, so that advantageous internal reaction effects, similar to a lock nut effect, may be obtained.

I claim:

1. A self-tapping self-locking externally screwthreaded insert member for cutting its own cooperating thread in a workpiece of a soft material such as aluminum plastics, wood or the like, by axially applied pressure and self induced rotation wherein, with a predetermined pitch angle ($\gamma$) and with a predetermined friction angle ($\rho$) which is determined by the friction number ($\mu$) and the resistance to cutting action between the material of the threaded member and the workpiece, the angle of inclination ($\beta 1$) between the plane extending through the peak of the external thread and normal to the axis of the threaded member and that flank of the thread which is inclined away from the end of the threaded member which after installation terminates on the surface of the workpiece or projects therefrom, is selected to be such that:

$$tg\ \gamma > tg\ \rho \cdot \sqrt{1 + \cos^2\gamma \cdot tg^2\beta 1}$$

and the angle ($\beta 2$) between the said plane and the flank inclined towards the said end of the threaded member is selected to be such that:

$$tg\ \gamma \leq tg\ \rho \cdot \sqrt{1 + \cos^2\gamma \cdot tg^2\beta 2},$$

wherein the pitch angle $\gamma$ is greater than the predetermined friction angle $\rho$.

2. A threaded member in accordance with claim 1, provided with an internal thread to receive a mounting element.

3. A threaded member in accordance with claim 1, provided with an additional thread for receiving a mounting element, said additional thread being a self-locking thread.

4. A threaded member according to claim 3, wherein the additional thread has a direction of pitch opposite to the direction of pitch of the main thread of the member used for insertion in the workpiece.

5. A threaded member in accordance with claim 1, wherein the forward end portion of the member with respect to the direction of insertion is not provided with said external thread.

6. A threaded member according to claim 1, wherein the lower end of the threaded member is provided with a slot and the thread starts at the edge of the slot.

7. A threaded member according to claim 1, wherein the said end of the threaded member is provided with a knurled periphery.

8. A threaded member according to claim 1, wherein the thread used for insertion is a multiple thread.

9. A threaded member in accordance with claim 1, wherein the pitch angle of the thread used for insertion decreases towards said end of the member.

10. A self-tapping, self-locking screw threaded insert member adapted to be inserted into a hole defined in a soft material such as aluminum, plastic, wood, or the like by axial pressure comprising, in combination, a substantially cylindrical body member having an axis, an exterior surface, a forward end with respect to the direction of insertion, and a rearward end, a helical thread projection defined on said exterior surface spiralling about said axis and radially extending from said surface, said thread projection including a peak, a forward flank disposed toward said forward end and a rearward flank disposed toward said rearward end, said helical thread projection having a predetermined pitch angle ($\gamma$) and a predetermined friction angle ($\rho$) determined by the cofficient of friction ($\mu$) and the resistance to the cutting action between the material of the threaded member and that of the member defining the hole, the angle of inclination ($\beta 1$) between the plane extending through the thread peak and perpendicular to the axis of the member and said forward flank being such that:

$$tg\ \gamma > tg\ \rho \cdot \sqrt{1 + \cos^2\gamma \cdot tg^2\beta_1}$$

and the angle ($\beta 2$) between the said plane and said rearward flank being such that:

$$tg\gamma \leq tg\ \rho \cdot \sqrt{1 + \cos^2\gamma \cdot tg^2\beta 2}$$

wherein said pitch angle $\gamma$ is greater than said predetermined friction angle $\rho$ wherein said rearward flank defines a friction locking angle preventing withdrawal of said insert member, and attachment means defined on said body member.

11. In a self-tapping, self-locking screw threaded insert member as in claim 10, a chip receiving slot defined in said body member adjacent said forward end, said thread projection intersecting said slot and defining a sharp cutting edge therewith.

* * * * *

UNITED STATES PATENT OFFICE
CERTIFICATE OF CORRECTION

Patent No. 3,662,643          Dated  May 16, 1972

Inventor(s) Harry Scheffer

It is certified that error appears in the above-identified patent and that said Letters Patent are hereby corrected as shown below:

Column 1, line 62, change " $\gamma$ " to -- $\beta$ --.

Column 1, line 69, the relationship set forth below the square root sign should read as follows:

$$\sqrt{1 + \cos^2 \gamma \cdot \text{tg}^2 \beta} \; 1$$

Column 1, line 70, change " $\gamma$ " to -- $\beta$ --.

Column 3, line 65, after "aluminum" insert -- $\perp$ --.

Signed and sealed this 9th day of January 1973.

(SEAL)
Attest:

EDWARD M. FLETCHER, JR.
Attesting Officer

ROBERT GOTTSCHALK
Commissioner of Patents